US012615109B2

(12) United States Patent
Fan et al.

(10) Patent No.: US 12,615,109 B2
(45) Date of Patent: Apr. 28, 2026

(54) COMMUNICATION METHOD AND APPARATUS

(71) Applicant: HUAWEI TECHNOLOGIES CO., LTD., Shenzhen (CN)

(72) Inventors: Qiang Fan, Shanghai (CN); Chunhua You, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 265 days.

(21) Appl. No.: 18/304,603

(22) Filed: Apr. 21, 2023

(65) Prior Publication Data

US 2023/0269036 A1 Aug. 24, 2023

Related U.S. Application Data

(63) Continuation of application No. PCT/CN2020/122590, filed on Oct. 21, 2020.

(51) Int. Cl.
*H04L 1/1829* (2023.01)
*H04W 72/1263* (2023.01)

(52) U.S. Cl.
CPC .......... *H04L 1/1854* (2013.01); *H04L 1/1835* (2013.01); *H04W 72/1263* (2013.01)

(58) Field of Classification Search
None
See application file for complete search history.

(56) References Cited

U.S. PATENT DOCUMENTS

| | | | |
|---|---|---|---|
| 12,308,973 B2 * | 5/2025 | Fu ......................... | H04W 72/56 |
| 2020/0274654 A1 | 8/2020 | Loehr et al. | |
| 2022/0150951 A1 * | 5/2022 | Lu ......................... | H04L 1/1822 |
| 2022/0158769 A1 * | 5/2022 | Gou ...................... | H04W 72/23 |
| 2022/0294572 A1 * | 9/2022 | Wu ....................... | H04L 1/1812 |
| 2023/0058734 A1 * | 2/2023 | Xiao ...................... | H04L 1/1812 |

FOREIGN PATENT DOCUMENTS

| | | |
|---|---|---|
| CN | 110535555 A | 12/2019 |
| CN | 110621075 A | 12/2019 |
| CN | 111385070 A | 7/2020 |
| CN | 111742511 A | 10/2020 |
| CN | 111865508 A | 10/2020 |
| JP | 2022543164 A | 10/2022 |

(Continued)

OTHER PUBLICATIONS

Extended European Search Report issued in corresponding European Application No. 20958113.1, dated Oct. 9, 2023, pp. 1-7.

(Continued)

*Primary Examiner* — Saumit Shah
(74) *Attorney, Agent, or Firm* — HAUPTMAN HAM, LLP

(57) ABSTRACT

A communication method and apparatus. A terminal device determines a priority of a first hybrid automatic repeat request HARQ process. The terminal device determines a target HARQ process from the first HARQ process based on the priority, to transmit data to a network device on a target configured grant by using the target HARQ process. The first HARQ process includes at least one HARQ process corresponding to the target configured grant thereby reducing a latency of transmitting data by using the target HARQ process.

14 Claims, 3 Drawing Sheets

Terminal device

Network device

S210: Determine a priority of first hybrid automatic repeat request HARQ process, where the first HARQ process comprises at least one HARQ process corresponding to a target configured grant S220: Determine a target HARQ process based on the priority of the first HARQ process S230: Transmit data on the target configured grant by using the target HARQ process

(56)　　　　　　　References Cited

FOREIGN PATENT DOCUMENTS

WO　　　　2020094124　A1　　5/2020

OTHER PUBLICATIONS

Chinese First Office Action issued in corresponding Chinese Application No. 202080106271.9, dated Mar. 21, 2025, pp. 1-23.

Japanese Office Action issued in corresponding Japanese Application No. 2023-524332, dated Mar. 5, 2024, pp. 1-6.

Nokia et al on LTL enhancements for IIoT/URLLC in unlicensedcontrolled environment 3GPP TSG RAN WG1 Meeting #102-eR1-2006247,Aug. 28, 2020,total 4 pages.

3GPP TSG RAN Meeting #88e, RP-201310,Revised WID: Enhanced Industrial Internet of Things (IoT) and ultra-reliable and low latency communication (URLLC) support for NR.Nokia, Nokia Shanghai Bell,Electronic meeting, Jun. 29-Jul. 3, 2020,total 6 pages.

3GPP TS 38.321 V16.2.1:"3rd Generation Partnership Project;Technical Specification Group Radio Access Network;NR;Medium Access Control (MAC) protocol specification(Release 16)",Sep. 2020,total 154 pages.

3GPP TS 38.331 v16.2.0:3rd Generation Partnership Project;Technical Specification Group Radio Access Network;NR;Radio Resource Control (RRC) protocol specification(Release 16),Sep. 2020,total 921 pages.

3GPP RAN WG2 Meeting #111-e,R2-2007614,IIoT operation in unlicensed controlled environments,InterDigital,Aug. 17-28, 2020,total 3 pages.

International Search Report issued in corresponding International Application No. PCT/CN2020/122590, dated Jul. 22, 2021, pp. 1-12.

* cited by examiner

COMMUNICATION METHOD AND APPARATUS

CROSS-REFERENCE TO RELATED APPLICATIONS

This application is a continuation of International Application No. PCT/CN2020/122590, filed on Oct. 21, 2020, the disclosure of which is hereby incorporated by reference in its entirety.

TECHNICAL FIELD

Embodiments of this application relate to the field of information technologies, and in particular, to a communication method and apparatus.

BACKGROUND

Compared with a 4th generation (4G) mobile communication system, a 5th generation (5G) mobile communication system has a significant feature, that is, an ultra-reliable and low-latency communications (URLLC) service is additionally supported. There are a plurality of types of URLLC services. Typical examples include industrial control, self-driving, remote surgery, smart grid, and the like. A typical requirement of the URLLC service is that reliability of sending 32-byte data within 1 millisecond (ms) needs to reach 99.999%. it should be noted that the foregoing performance indicator is merely an example, and different URLLC services may have different requirements for reliability. For example, in some extremely demanding industrial control application scenarios, a probability of successfully transmitting URLLC service data needs to reach 99.9999999% within 0.25 ms.

SUMMARY

In view of this, embodiments described herein provide a communication method and apparatus, to reduce latency in data transmission.

According to a first aspect, embodiments described herein provide a communication method. The method is performed by a terminal device or a chip or a module in a terminal device. An example in which the method is performed by the terminal device is used herein for description. A terminal device determines a priority of a first hybrid automatic repeat request HARQ process.

The first HARQ process comprises at least one HARQ process corresponding to a target configured grant. The terminal device determines a target HARQ process based on the priority of the first HARQ process. The terminal device transmits data to a network device on the target configured grant by using the target HARQ process.

According to the method described in the first aspect, the terminal device flexibly determines, based on the priority of the first HARQ process, a target HARQ process associated with the target configured grant, to reduce a latency of transmitting data by using the target HARQ process.

In an implementation of the first aspect, the target HARQ process is a HARQ process having a highest priority in the first HARQ process. By implementing the method, the HARQ process having the highest priority in the first HARQ process is associated with the target configured grant, to reduce a latency of transmitting data by using the HARQ process having the highest priority.

In an implementation of the first aspect, that a terminal device determines a priority of a first HARQ process includes: The terminal device determines the priority of the first HARQ process based on first data corresponding to the first HARQ process. The first data includes: a media access control protocol data unit MAC PDU buffered in a buffer of the first HARQ process, or data that is transmitted in the first HARQ process. The priority of the first HARQ process is a priority of each HARQ process in the first HARQ process, and the priority of each HARQ process is determined by first data corresponding to the HARQ process.

In an implementation of the first aspect, that the terminal device determines the priority of the first HARQ process based on first data corresponding to the first HARQ process includes: determining the priority of the first HARQ process based on at least one of the following information: a priority of a logical channel corresponding to the first data, a priority of a MAC control element included in the first data, and quality of service information of the first data.

In an implementation of the first aspect, the method further includes: The terminal device receives first indication information from the network device. The first indication information indicates to determine the target HARQ process based on the priority of the first HARQ process. By implementing the method, the terminal device determines the target HARQ process based on an indication of the network device and the priority, and determines the target HARQ process in a specific scenario based on the priority, which helps improve flexibility of a method for determining the target HARQ process.

In an implementation of the first aspect, that the terminal device determines the target HARQ process based on the priority of the first HARQ process includes: in response to there being at least two HARQ processes having same and highest priorities in the first HARQ process, the terminal device determines the target HARQ process from the at least two HARQ processes.

In an implementation of the first aspect, the determining the target HARQ process from the at least two HARQ processes includes: determining the target HARQ process from the at least two HARQ processes based on whether one of the at least two HARQ processes is used for retransmitting data; determining the target HARQ process from the at least two HARQ processes based on identifiers of the at least two HARQ processes; or determining the target HARQ process from the at least two HARQ processes based on remaining duration of a configured grant timer associated with the at least two HARQ processes.

According to a second aspect, embodiments described herein provide a communication method. The method is performed by a terminal device or a chip or a module in a terminal device. An example in which the method is performed by the terminal device is used herein for description. A terminal device receives second indication information from a network device. The second indication information indicates a target HARQ process. The terminal device determines the target HARQ process from a first HARQ process based on the second indication information. The first HARQ process comprises at least one HARQ process corresponding to the target configured grant. The terminal device transmits data to a network device on the target configured grant by using the target HARQ process.

By implementing the method described in the second aspect, the terminal device flexibly determines the target HARQ process based on the second indication information of the network device, and the network device indicates different target HARQ processes through different second indication information in different service scenarios, to meet quality requirements for data transmission in different service scenarios.

In an implementation of the second aspect, that the second indication information indicates a target HARQ process includes: The second indication information indicates that the target HARQ process is a HARQ process in which retransmission needs to be performed in the first HARQ process.

In an implementation of the second aspect, that the second indication information indicates a target HARQ process includes: The second indication information indicates that the target HARQ process is a HARQ process in which new transmission needs to be performed in the first HARQ process.

In an implementation of the second aspect, that the second indication information indicates a target HARQ process includes: The second indication information indicates that the target HARQ process is a HARQ process having a highest priority in the first HARQ process. By implementing the method, the terminal device selects the HARQ process having the highest priority as the target HARQ process based on the second indication information of the network device, which helps reduce a latency of transmitting data by using the HARQ process having the highest priority.

According to a third aspect, at least one embodiment provides a communication method. The method is performed by a terminal device or a chip or a module in a terminal device. An example in which the method is performed by the terminal device is used herein for description. A terminal device generates second data. The second data is buffered in a buffer of a target HARQ process associated with a target configured grant. The terminal device sends information about the target HARQ process to a network device in response to the terminal device not sending the second data to the network device.

By implementing the method described in the third aspect, the terminal device sends, before sending the second data buffered in the target HARQ process, the information about the target HARQ process to the network device, so that the network device allocates an uplink grant to the target HARQ process based on the information about the target HARQ process, and the terminal device sends the second data on the allocated uplink grant, to reduce a latency of transmitting the second data.

In an implementation of the third aspect, that the terminal device does not send the second data to a network device includes: The target configured grant overlaps a first uplink grant in time domain, and a priority of the target configured grant is lower than a priority of the first uplink grant; or a channel corresponding to the target configured grant is not idle.

In an implementation of the third aspect, that the terminal device sends information about the target HARQ process to a network device in response to the terminal device not sending the second data to the network device includes: triggering a first event in response to the terminal device not sending the second data to the network device; and sending information about a target HARQ process corresponding to the first event to the network device based on the first event, where the sending information about a target HARQ process corresponding to the first event to the network device based on the first event includes: sending information about a target HARQ processes corresponding to at least one first event to the network device. By implementing the method, the terminal device records, through the first event, a target HARQ process in which the second data is not sent, to periodically obtain all target HARQ processes corresponding to all first events triggered in a current period, and further send information about all target HARQ processes in which the second data is not sent in the period to the network device at one time. In this way, a case that the information about the target HARQ process is sent once each time the second data is not transmitted in one target HARQ process is avoided, which helps reduce an uplink transmission resource occupied for sending the information about the target HARQ process.

In an implementation of the third aspect, the sending information about the target HARQ process to the network device includes: in response to there being an available uplink grant, sending the information about the target HARQ process to the network device through the available uplink grant. By implementing the method, the terminal device transmits the information about the target HARQ process by using the available uplink grant, and does not need to wait for scheduling a new uplink grant, which helps improve real-time performance of sending the information about the target HARQ process.

In an implementation of the third aspect, the sending information about the target HARQ process to the network device includes: in response to there being no available uplink grant, sending a scheduling request to the network device, where the scheduling request is used to request allocation of an uplink grant; and sending the information about the target HARQ process to the network device through the uplink grant allocated by the network device. By implementing the method, the terminal device schedules an uplink grant in response to there being no available uplink grant, to send the information about the target HARQ process, and ensure that the information about the target HARQ process is successfully sent.

In an implementation of the third aspect, the method further includes: canceling the first event in response to the second data being successfully transmitted or the information about the target HARQ process is successfully sent on a second uplink grant, where the second uplink grant is a configured grant or a dynamic grant.

According to a fourth aspect, at least one embodiment provides a communication method. The method is performed by a network device or a chip or a module in a network device. An example in which the method is performed by the network device is used herein for description. A network device sends second indication information to a terminal device. The second indication information indicates a target HARQ process. The network device receives data on a target configured grant from the terminal device. The target HARQ process is a HARQ process in a first HARQ process, and the first HARQ process comprises at least one HARQ process corresponding to the target configured grant.

The method described in the fourth aspect is a network-side method corresponding to the method described in the second aspect. Therefore, beneficial effects in the second aspect is also achieved.

In an implementation of the fourth aspect, the second indication information indicates that the target HARQ process is a HARQ process in which retransmission needs to be performed in the first HARQ process.

In an implementation of the fourth aspect, the second indication information indicates that the target HARQ process is a HARQ process in which new transmission needs to be performed in the first HARQ process.

In an implementation of the fourth aspect, the second indication information indicates that the target HARQ process is a HARQ process having a highest priority in the first HARQ process.

According to a fifth aspect, embodiments described herein provide a communication apparatus. The apparatus includes: a function module configured to implement the method in the first aspect, or in the third aspect.

According to a sixth aspect, embodiments described herein provide a communication apparatus. The apparatus includes: a function module configured to implement the method in the second aspect.

According to a seventh aspect, embodiments described herein provide a communication apparatus. The apparatus includes: a function module configured to implement the method in the fourth aspect or any possible implementation of the fourth aspect.

According to an eighth aspect, embodiments described herein provide a communication apparatus. The apparatus includes: a processor and a memory. The processor is coupled to the memory, and the processor is configured to implement the method provided in the first aspect or the third aspect.

According to a ninth aspect, embodiments described herein provide a communication apparatus. The apparatus includes a processor and a memory. The processor is coupled to the memory, and the processor is configured to implement the method provided in the second aspect.

According to a tenth aspect, embodiments described herein provide a communication apparatus. The apparatus includes: a processor and a memory. The processor is coupled to the memory, and the processor is configured to implement the method provided in the fourth aspect.

According to an eleventh aspect, embodiments described herein provide a communication apparatus. The apparatus includes: a processor and an interface circuit. The interface circuit is configured to receive a signal from a communication apparatus other than the communication apparatus, and transmit the signal to the processor, or send a signal from the processor to a communication apparatus other than the communication apparatus. The processor is configured to implement the method provided in the first aspect or the third aspect by using a logic circuit or by executing code instructions.

According to a twelfth aspect, embodiments described herein provide a communication apparatus. The apparatus includes: a processor and an interface circuit. The interface circuit is configured to receive a signal from a communication apparatus other than the communication apparatus, and transmit the signal to the processor, or send a signal from the processor to a communication apparatus other than the communication apparatus. The processor is configured to implement the method provided in the second aspect by using a logic circuit or by executing code instructions.

According to a thirteenth aspect, embodiments described herein provide a communication apparatus. The apparatus includes: a processor and an interface circuit. The interface circuit is configured to receive a signal from a communication apparatus other than the communication apparatus, and transmit the signal to the processor, or send a signal from the processor to a communication apparatus other than the communication apparatus. The processor is configured to implement the method provided in the fourth aspect by using a logic circuit or by executing code instructions.

According to a fourteenth aspect, embodiments described herein provide a computer-readable storage medium. The computer-readable storage medium is configured to store a computer program, and the computer program enables a computer to perform the method according to any one of the first aspect, the second aspect, the third aspect, or the fourth aspect.

According to a fifteenth aspect, embodiments described herein provide a computer program product. The computer program product includes instructions, and in response to the instructions being run by a computer, the method according to any one of the first aspect, the second aspect, the third aspect, or the fourth aspect is implemented.

According to a sixteenth aspect, embodiments described herein provide a computer program. The computer program includes code or instructions, and in response to the code or the instructions being run, the method in the foregoing first aspect, the second aspect, the third aspect, or the fourth aspect is implemented.

According to a seventeenth aspect, embodiments described herein provide a chip system. The chip system includes a processor, and further includes a memory. The chip system is configured to implement at least one method described in the first aspect, the second aspect, the third aspect, or the fourth aspect. The chip system includes a chip, or includes a chip and another discrete component.

According to an eighteenth aspect, embodiments described herein provide a communication system. The communication system includes the apparatus according to the sixth aspect, the ninth aspect, or the twelfth aspect, and the communication apparatus according to the seventh aspect, the tenth aspect, or the thirteenth aspect.

DESCRIPTION OF EMBODIMENTS

Figures 1, 2, 3:
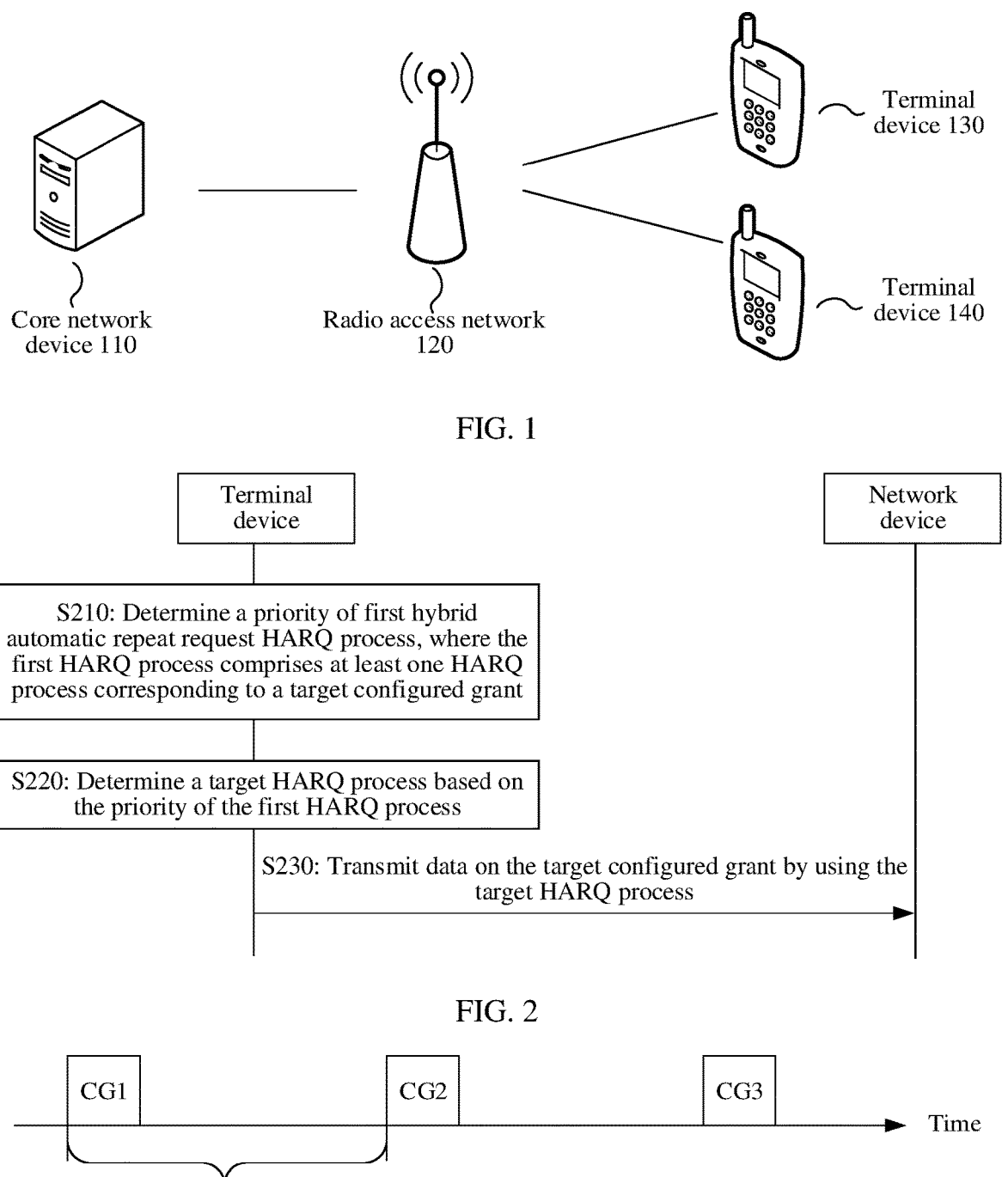
FIG. 1 is a schematic diagram of an architecture of a communication system according to at least one embodiment.
FIG. 2 is a schematic flowchart of a communication method according to at least one embodiment.
FIG. 3 is a schematic diagram of a period of a configured grant according to at least one embodiment.

Technical solutions provided in at least one embodiment is applied to various communication systems, for example, a long term evolution (LTE) system, a 5th generation (5G) mobile communication system, a Wi-Fi system, a future communication system, a system integrating a plurality of communication systems, or the like. This is not limited in embodiments described herein. 5G is also referred to as new radio (NR).

The technical solutions provided in at least one embodiment is applied to various communication scenarios, for example, is applied to one or more of the following communication scenarios: enhanced mobile broadband (eMBB), ultra-reliable low-latency communication (URLLC), machine type communication (MTC), massive machine-type communications (mMTC), device-to-device (D2D), vehicle to everything (vehicle to everything, V2X), vehicle to vehicle (V2V), internet of things (IoT), and the like.

The technical solutions provided in at least one embodiment is applied to communication between communication devices. The communication between the communication devices includes communication between a network device and a terminal device, communication between network devices, and/or communication between terminal devices. In at least one embodiment, the term "communication" is also described as "transmission", "information transmission", "signal transmission", or the like. The transmission includes sending and/or receiving. In at least one embodiment, the communication between the network device and the terminal device is used as an example to describe the technical solutions. A person skilled in the art also applies the technical solutions to other communication between a scheduling entity and a subordinate entity, for example, communication between a macro base station and a micro base station, for example, communication between a first terminal device and a second terminal device. The scheduling entity allocates an air interface resource to the subordinate entity. The air interface resources include one or more of the following resources: a time domain resource, a frequency domain resource, a code resource, and a spatial resource. In at least one embodiment, "a plurality of types" is two types, three types, four types, or more types. This is not limited in at least one embodiment.

In at least one embodiment, the communication between the network device and the terminal device includes: The network device sends a downlink signal/downlink information to the terminal device, and/or the terminal device sends an uplink signal/uplink information to the network device.

In at least one embodiment, "/" represents an "or" relationship between associated objects. For example, A/B represents A or B. The term "and/or" is used to indicate that there are three relationships between the associated objects. For example, A and/or B represents the following three cases: Only A exists, both A and B exist, and only B exists. A and B is singular or plural. In at least one embodiment, terms such as "first" or "second" is used to distinguish between technical features with a same or similar function. Terms such as "first" and "second" do not limit a quantity and an execution sequence, and the terms such as "first" and "second" do not indicate a definite difference. In at least one embodiment, terms such as "example" or "for example" are used to represent giving an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding.

FIG. 1 is a schematic diagram of an architecture of a mobile communication system according to at least one embodiment. As shown in FIG. 1, the mobile communication system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device is independent and different physical devices, or functions of the core network device and logical functions of the radio access network device are integrated into a same physical device, or a part of functions of the core network device and a part of functions of the radio access network device are integrated into one physical device. The terminal device is located at a fixed position, or is mobile. FIG. 1 is only a schematic diagram. The communication system further includes another network device, for example, further includes a wireless relay device and a wireless backhaul device, which are not shown in FIG. 1. Quantities of core network devices, radio access network devices, and terminal devices included in the mobile communication system are not limited in at least one embodiment.

The radio access network device is an access device that is used by the terminal device to access the mobile communication system in a wireless manner. The radio access network device is a base station, an evolved NodeB (eNodeB), a transmission reception point (TRP), a next generation NodeB (gNB) in a 5G mobile communication system, a base station in a future mobile communication system, an access node in a Wi-Fi system, or the like. Alternatively, the radio access network device is a module or a unit that completes a part of functions of a base station, for example, is a central unit (CU) or a distributed unit (DU). A specific technology and a specific device form that are used by the radio access network device are not limited in at least one embodiment. In at least one embodiment, the radio access network device is referred to as a network device for short. Unless otherwise specified, network devices are all radio access network devices.

In at least one embodiment, an apparatus configured to implement a function of the network device is a network device, or is an apparatus, for example, a chip system, that supports the network device in implementing the function. The apparatus is deployed in the network device, or is used together with the network device. In the technical solutions provided in at least one embodiment, the technical solutions provided in at least one embodiment are described by using an example in which the apparatus configured to implement the function of the network device is the network device.

The terminal device in at least one embodiment is also referred to as a terminal, user equipment (UE), a mobile station (MS), a mobile terminal (MT), or the like. The terminal device is a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form that are used by the terminal device are not limited in at least one embodiment.

In at least one embodiment, an apparatus configured to implement a function of the terminal device is a terminal device, or is an apparatus, for example, a chip system, that supports the terminal device in implementing the function. The apparatus is deployed on the terminal device, or is used together with the terminal device. In at least one embodiment, the chip system includes a chip, or includes a chip and another discrete component. The technical solutions provided in at least one embodiment are described by using an example in which the apparatus configured to implement the function of the terminal device is the terminal device.

The network device and the terminal device is deployed on land, where the deployment includes indoor or outdoor, or handheld or vehicle-mounted deployment, is deployed on water, or is deployed on an airplane, a balloon, or an artificial satellite in the air. An application scenario of the network device and the terminal device is not limited in at least one embodiment.

In the communication system, the terminal device accesses the network device and communicate with the network device. For example, one network device manages one or more (for example, three or six) cells, and the terminal device accesses the network device in at least one of the one or more cells, and communicate with the network device in a cell in which the terminal device is located. In at least one embodiment, at least one is one, two, three, or more. This is not limited in at least one embodiment.

In the mobile communication system shown in FIG. 1, the terminal device transmits data to a base station through an uplink transmission resource, to implement uplink communication between the terminal device and the base station. Before transmitting the data, the terminal device needs to obtain the uplink transmission resource through an uplink grant, to transmit the data through the uplink transmission resource. The uplink grant includes: a configured grant (CG) and a dynamic grant (DG). The dynamic grant means that, each time before transmitting the data, the terminal device needs to request the base station to allocate the uplink transmission resource, and the base station dynamically allocates an uplink transmission resource used for current transmission to the terminal device. A resource obtained through the dynamic grant is referred to as a dynamic grant resource. The configured grant means that the base station sends an allocated uplink transmission resource to the terminal device in advance. In response to the terminal device needing to send uplink data, the terminal device only needs to select an uplink transmission resource for current transmission from the pre-allocated uplink transmission resource, and does not need to request the uplink transmission resource from the base station. A resource obtained through the configured grant is referred to as a configured grant resource.

In response to transmission being performed through the foregoing configured grant, a CG-timer (CG-T) is configured for the configured grant, and a CG-retransmission timer (CG-RT) is further configured for a configured grant configured on an unlicensed spectrum. The CG-RT is used for limiting whether retransmission is performed in an associated HARQ process. The CG-RT is started or restarted in response to the HARQ process performing new transmission or retransmission. After the CG-RT expires, data buffered in a HARQ process associated with the CG-RT is automatically retransmitted by a terminal device, that is, the terminal device retransmits the buffered data by using a subsequent CG resource.

The CG-T is used for limiting whether new transmission is performed in the associated HARQ process. The CG-T is started in response to the HARQ process performing new transmission. In response to the CG-T running, the associated HARQ process cannot use an arrived CG to perform new transmission.

In response to a configured grant arriving, the configured grant is associated with a HARQ process. In response to a MAC PDU being formed for the configured grant, and the terminal device detecting that a channel is idle (LBT succeeds), the terminal device sends the formed MAC PDU by using the configured grant. The terminal device starts a CG-T and a CG-RT associated with the HARQ process, and in this case, the HARQ process associated with the configured grant is in a non-pending state. Otherwise, in response to the terminal device detecting that the channel is busy (LBT fails), the terminal device cannot send the MAC PDU.

Correspondingly, the CG-T and the CG-RT associated with the HARQ process are not started, and in this case, the HARQ process associated with the configured grant is in a pending state.

Main steps of performing data transmission based on the foregoing configured grant include: first, in response to a configured grant resource of the terminal device arriving, forming a media access control (MAC) protocol data unit (PDU); then, selecting a target HARQ process from a plurality of hybrid automatic repeat request (HARQ) processes pre-allocated by the network device to the terminal device; and finally, sending a formed MAC PDU to the network device through the target HARQ process. In this implementation, the terminal device cannot ensure a latency of transmitting specified data.

To resolve the foregoing technical problem, at least one embodiment provides a communication method, to determine priority of first HARQ process, and determine a target HARQ process based on the priorities, so that a terminal device invokes the target HARQ process to transmit data on a target configured grant. In this way, a target HARQ process associated with the target configured grant is flexibly determined based on the priority of the first HARQ process, so that a latency of transmitting data by using the target HARQ process is reduced.

FIG. 2 is a schematic flowchart of a communication method according to at least one embodiment. This embodiment relates to a specific process of data transmission between a network device and a terminal device. As shown in FIG. 2, the method includes: S210, S220, and S230.

S210: A terminal device determines a priority of first hybrid automatic repeat request HARQ process, where the first HARQ process comprises at least one HARQ process corresponding to a target configured grant.

The target configured grant is classified into the following two types.

Type 1: A network device configures a transmission parameter of a CG for a terminal device through a parameter (for example, ConfiguredGrantConfig) in an RRC message, for example, configures one or more of the following parameters: a period, an open-loop power control related parameter, a waveform, a redundancy version, a redundancy version sequence, a repetition quantity, a frequency hopping mode, a resource allocation type, a quantity of hybrid automatic repeat request (HARQ) processes, a demodulation reference signal (DMRS) related parameter, a modulation and coding scheme (MCS) table, a resource block group (RBG) size, and a time domain resource position, a frequency domain resource position, and an MCS.

Type 2: A network device configures some or all transmission parameters for a terminal device through an RRC message, for example, configures one or more of the following parameters: a time domain resource period, an open-loop power control related parameter, a waveform, a redundancy version, a redundancy version sequence, a repetition quantity, a frequency hopping mode, a resource allocation type, an MCS table, a DMRS related parameter, and a quantity of HARQ processes. In addition, the network device sends physical layer signaling such as downlink control information (DCI) to the terminal device to activate the type-2 CG. Optionally, the DCI is further used for configuring some transmission parameters, for example, configuring one or more of the following parameters: a time domain resource position, a frequency domain resource position, a DMRS related parameter, and an MCS. The DCI is carried by a physical downlink control channel (PDCCH).

In response to the terminal device performing uplink transmission by using the foregoing two types of CGs, the terminal device directly sends uplink data to the network device by using a CG preconfigured by the network device, and does not need to send a scheduling request (SR) to the network device and wait for a dynamic grant from the network device. the type-2 CG is used by the terminal device only after being activated by the physical layer signaling.

The first HARQ process comprises one or more HARQ processes associated with the target configured grant. The HARQ process associated with the target configured grant is preconfigured by the network device for the terminal device through RRC signaling, so that the target configured grant is also referred to as a target configured grant configuration. The terminal device stores a correspondence between the target configured grant and the first HARQ process in a local storage area.

Because a configured grant is periodic, a configured grant of a set of configured grants arrives periodically. In at least one embodiment, the period is referred to as a CG period. For example, as shown in FIG. 3, there is one configured grant in each CG period, and there are three CG periods, and corresponding configured grants CG1, CG2, and CG3 in FIG. 3.

In at least one embodiment, a configured grant that arrives at a current time or in a current period is referred to as a target configured grant. In response to the target configured grant arriving, a target HARQ process is selected from the first HARQ process to be associated with the target configured grant. The terminal device delivers the target configured grant to the target HARQ process for processing. Correspondingly, a MAC PDU processed by the target HARQ process is transmitted on the target configured grant.

In at least one embodiment, in the foregoing process of selecting the target HARQ process by the terminal device, reference is made to the priority of the first HARQ process. In actual application, the terminal device selects, with reference to a priority of each HARQ process in the first HARQ process, the target HARQ process from all HARQ processes in the first HARQ process, or selects, with reference to priorities of some HARQ processes in the first HARQ process, the target HARQ process from some HARQ processes in the first HARQ process. For ease of subsequent description, the priority of each HARQ process in the first HARQ process is used as an example for description.

Before the terminal device determines the target HARQ process associated with the target configured grant, the terminal device needs to determine the priority of the first HARQ process. The priority of the first HARQ process is represented by priority of data corresponding to the first HARQ process. In an example of at least one embodiment, that a terminal device determines priority of first HARQ process includes:

The terminal device determines the priority of the first HARQ process based on first data corresponding to the first HARQ process. The first data includes: a media access control protocol data unit MAC PDU buffered in a buffer of the first HARQ process, or data that is transmitted in the first HARQ process.

The data that is transmitted is data that is transmitted on the target configured grant associated with the first HARQ process in current to-be-transmitted data of the terminal device.

Optionally, that the terminal device determines the priority of the first HARQ process based on first data corresponding to the first HARQ process includes:

determining the priority of the first HARQ process based on at least one of the following information: a priority of a logical channel corresponding to the first data, a priority of a MAC control element included in the first data, and quality of service information of the first data.

In actual application, the first HARQ process includes a plurality of HARQ processes. Some HARQ processes need to retransmit buffered data, and some HARQ processes is used for performing new transmission. For example, in response to a configured grant being configured with an associated CG-T and CG-RT: in response to a CG-T associated with a HARQ process being running but a CG-RT associated with the HARQ process is not running, or neither a CG-T nor a CG-RT associated with a HARQ process is running and the HARQ process is in a pending state, retransmission needs to be performed in the HARQ process; and in response to neither a CG-T nor a CG-RT associated with a HARQ process running and the HARQ process being in a non-pending state, the HARQ process is used for new transmission.

In at least one embodiment, in response to one of the first HARQ process being a HARQ process in which retransmission needs to be performed, the terminal device determines a priority of the HARQ process by using information about a data packet in a buffer of the terminal device, where the data packet is a MAC PDU. In response to one of the first HARQ process being a HARQ process in which new transmission needs to be performed, the terminal device determines a priority of the HARQ process by using data that is transmitted by a configured grant. The data that is transmitted by the configured grant means that there is to-be-transmitted data on a logical channel and the logical channel is mapped to a target configured grant. For example, a configured grant configuration that is configured by the terminal device for the logical channel and that allows transmission includes the target configured grant.

In a process in which the terminal device determines a priority based on data, first, the terminal device determines a logical channel to which data corresponding to a HARQ process belongs, a MAC control element (CE) included in the data, and quality of service information of the data. Then, the terminal device determines a priority of each logical channel and a priority of each MAC CE, and maps each piece of the quality of service information to a priority based on a preset mapping relationship. Then, the terminal device determines a highest priority of a plurality of logical channels, a highest priority of a plurality of MAC CEs, and a highest priority of a plurality of pieces of the quality of service information. Finally, the terminal device selects a highest priority from the highest priority of the logical channel, the highest priority of the MAC CE, and the highest priority of the quality of service information as a priority of the HARQ process.

Certainly, a specific sequence of the foregoing processes is flexibly adjusted, and a sequence of steps for obtaining the highest priority is not limited in at least one embodiment. Certainly, the terminal device determines the priority of the HARQ process based on one or more of the logical channel, the MAC CE, and the quality of service information. For example, the terminal device determines the priority of the HARQ process based on a logical channel to which data belongs, that is, a highest priority of the logical channel is used as the priority of the HARQ process. Alternatively, the terminal device determines the priority of the HARQ process based on a MAC CE included in data, that is, a highest priority of the MAC CE included in the data is used as the priority of the HARQ process. Alternatively, the terminal device determines the priority of the HARQ process based on quality of service information of data, that is, a highest priority of the quality of service information of the data is used as the priority of the HARQ process. In another example, the terminal device determines the priority of the HARQ process based on a logical channel to which data belongs and a MAC CE included in the data, that is, a highest priority in a highest priority of the logical channel and a highest priority of the MAC CE included in the data is used as the priority of the HARQ process. Alternatively, the terminal device determines the priority of the HARQ process based on a logical channel to which data belongs and quality of service information of the data, that is, a highest priority in a highest priority of the logical channel and a highest priority of the quality of service information of the data is used as the priority of the HARQ process. Alternatively, the terminal device determines the priority of the HARQ process based on quality of service information of data and a MAC CE included in the data, that is, a highest priority in a highest priority of the quality of service information of the data and a highest priority of the MAC CE included in the data is used as the priority of the HARQ process.

The quality of service information includes but is not limited to parameters such as a latency, a packet loss rate, a bit error rate, and reliability. These parameters are target parameters preset for data, and reflect a quality requirement for data transmission. In response to the quality of service information being a positive parameter, the quality of service information and the priority are in a positive relationship; otherwise, the quality of service information and the priority are in a negative relationship. the larger a value of the positive parameter is, the higher quality of service is; and the smaller a value of the positive parameter is, the lower the quality of service is.

On the contrary, the larger a value of a negative parameter is, the lower quality of service is; and the smaller the value of the negative parameter is, the higher the quality of service is. Based on this, the latency, the packet loss rate, and the bit error rate are all negative parameters, and the reliability is a positive parameter. For example, in response to the quality of service information being a latency, a smaller latency indicates a higher requirement for a latency of transmitting data, and a corresponding priority is higher. On the contrary, the priority is lower. In another example, in response to the quality of service information being reliability, larger reliability indicates a higher requirement for reliability of data transmission, and in this case, a corresponding priority is higher. On the contrary, the priority is lower.

Values of the quality of service information are usually consecutive, and priorities of the quality of service information are usually non-consecutive. Therefore, the terminal device maps the quality of service information based on a value range and a priority. For example, quality of service information of a positive parameter is mapped to priorities by referring to the following formula:

$$P = \begin{cases} P1 & QOS \le QOS1 \\ P2 & QOS1 < QOS \le QOS2 \\ P3 & QOS2 < QOS \end{cases} \quad (1)$$

P is a priority, and the priorities are classified into P1, P2, and P3. P1 is lower than P2, and P2 is lower than P3. QOS is quality of service information. QOS1 and QOS2 are two fixed values of the quality of service information, and QOS1<QOS2.

In actual application, the terminal device determines, in the foregoing manner, a priority of a HARQ process in which retransmission needs to be performed in a process of forming a MAC PDU, and use the priority as a priority corresponding to the HARQ process. Alternatively, in response to determining a target HARQ process for an arrived target configured grant, the terminal device determines, based on data in a buffer of the HARQ process in which retransmission needs to be performed, a priority corresponding to the HARQ process. The terminal device determines, based on data that is transmitted in a target configured grant, a priority of a HARQ process in which new transmission needs to be performed.

Optionally, in another example of at least one embodiment, before a terminal device determines priority of first HARQ process, the example further includes:

The terminal device receives first indication information from the network device. The first indication information indicates to determine the target HARQ process based on the priority of the first HARQ process.

The first indication information is carried in an RRC message. In an example, the terminal device determines an association manner based on whether the RRC message carries the first indication information. The association manner is: In response to the RRC message carrying the first indication information, the terminal device determines, based on the priority of the first HARQ process, a target HARQ process associated with a target configured grant. In response to the RRC message not carrying the first indication information, the terminal device preferentially associates, in a manner in the prior art, the target configured grant with a HARQ process in which retransmission needs to be performed. In another example, the terminal device determines an association manner based on a value of the first indication information carried in the RRC message. The association manner is: In response to the RRC carrying the first indication information and is a first value, the terminal device determines, based on the priority of the first HARQ process, a target HARQ process associated with a target configured grant. In response to the RRC carrying the first indication information and is a second value, the terminal device preferentially associates, in a manner in the prior art, the target configured grant with a HARQ process in which retransmission needs to be performed. In at least one embodiment, the network device instructs the terminal device to associate with a HARQ process based on a priority, to perform data transmission based on a priority of the HARQ process in a specific scenario, and reduce a latency of transmitting data by using a HARQ process having a relatively high priority in the specific scenario.

S220: The terminal device determines a target HARQ process based on the priority of the first HARQ process.

Because a target configured grant resource usually needs to be associated with one target HARQ process, in an example of at least one embodiment, in response to one HARQ process in the first HARQ process having a highest priority, the target HARQ process is a HARQ process having the highest priority; or in response to at least two HARQ processes in the first HARQ process having highest priorities, the target HARQ process needs to be further determined from the at least two HARQ processes.

Optionally, that the terminal device determines a target HARQ process based on the priority of the first HARQ process includes:

In response to there being at least two HARQ processes having same and highest priorities in the first HARQ process, the terminal device determines the target HARQ process from the at least two HARQ processes.

In actual application, the terminal device randomly selects one HARQ process from the at least two HARQ processes as the target HARQ process, and the terminal device further determines the target HARQ process from the at least two HARQ processes based on a specific policy. That the terminal device determines the target HARQ process from the at least two HARQ processes includes:

The terminal device determines the target HARQ process from the at least two HARQ processes based on whether one of the at least two HARQ processes is used for retransmitting data.

Alternatively, the terminal device determines the target HARQ process from the at least two HARQ processes based on identifiers of the at least two HARQ processes.

Alternatively, the terminal device determines the target HARQ process from the at least two HARQ processes based on remaining duration of a configured grant timer associated with the at least two HARQ processes.

The terminal device determines the target HARQ process in two manners based on whether retransmission needs to be performed. In a first manner, the terminal device determines one HARQ process in which retransmission needs to be performed as the target HARQ process.

In a second manner, the terminal device determines one HARQ process in which new transmission needs to be performed as the target HARQ process. There is a plurality of HARQ processes determined by the terminal device based on whether retransmission needs to be performed. In response to there being only one HARQ process, the terminal device uses the HARQ process as the target HARQ process. In response to there being at least two HARQ processes determined by the terminal device based on whether retransmission needs to be performed, the terminal device continues to determine the target HARQ process in another manner from the HARQ processes determined based on whether retransmission needs to be performed, or the terminal device selects any one of the at least two HARQ processes as the target HARQ process.

The terminal device determines the target HARQ process in two manners based on an identifier of the HARQ process. In a first manner, the terminal device uses a HARQ process whose identifier is largest as the target HARQ process. In a second manner, the terminal device uses a HARQ process whose identifier is smallest as the target HARQ process. Because the identifier of the HARQ process is unique, the terminal device determines one HARQ process based on the identifier, this HARQ process is used as the target HARQ process, and the terminal device does not need to determine the target HARQ process in another manner.

The terminal device determines the target HARQ process in two manners based on remaining duration of a configured grant timer associated with the HARQ process. In a first manner, the terminal device determines a HARQ process in which the remaining duration of the configured grant timer is shortest as the target HARQ process. In a second manner, the terminal device determines a HARQ process in which the remaining duration of the configured grant timer is longest as the target HARQ process There is a plurality of HARQ processes determined by the terminal device based on the remaining duration. In response to there being only one HARQ process, the terminal device uses the HARQ process as the target HARQ process. In response to there being at least two HARQ processes determined by the terminal device based on the remaining duration, the terminal device continues to determine the target HARQ process in another manner from the HARQ processes determined based on the remaining duration, or the terminal device selects any one of the at least two HARQ processes as the target HARQ process.

The terminal device determines a target process from the at least two HARQ processes with reference to the foregoing three manners. In response to there being still at least two target HARQ processes determined in one manner, the terminal device continues to determine the target process in the other manner until one target HARQ process is determined. For example, in response to there being five HARQ processes having highest and same priorities, retransmission HARQ processes: HARQ 1, HARQ 2, and HARQ 3 are first obtained from the five HARQ processes, and then a HARQ process HARQ 3 whose identifier is largest is obtained as the target HARQ process.

In addition, in response to the terminal device determining at least two HARQ processes based on whether the HARQ processes are used for retransmitting data and/or the remaining duration, there are two processing manners. In a first manner, the terminal device randomly selects one HARQ process as the target HARQ process from the HARQ processes determined based on whether the HARQ processes are used for retransmitting data and/or the remaining duration. In a second manner, the terminal device selects a HARQ process whose identifier is largest or smallest as the target HARQ process from the HARQ processes determined based on whether the HARQ processes are used for retransmitting data and/or the remaining duration.

In an example of at least one embodiment, the terminal device further indicates, through third indication information, that in response to there being at least two HARQ processes having highest priorities, the terminal device determines the target HARQ process based on whether the HARQ process is used for retransmitting data, an identifier of the HARQ process, or remaining duration of an associated configured grant timer. The third indication information is sent to the terminal device together with or independently of the first indication information. Alternatively, the third indication information is carried in RRC signaling and sent to the terminal device. Optionally, the third indication information is also used for indicating an association policy between the target HARQ process and the target configured grant.

In at least one embodiment, in a process of determining the target HARQ process based on the priority, the target HARQ process is further determined with reference to whether the HARQ process is used for retransmitting data, the identifier, and the remaining duration of the configured grant timer, so that accuracy of the determined target HARQ process is higher.

S230: The terminal device transmits data to a network device on the target configured grant by using the target HARQ process.

The data is uplink data sent by the terminal device to the network device, and includes but is not limited to: user data and control data. In response to the target HARQ process being used for new transmission of a HARQ process, in response to sending data, the terminal device first forms a data packet of a MAC PDU by using the data, then stores the data packet in a buffer of the target HARQ process, and finally invokes the target HARQ process to transmit the data on the target configured grant. In response to the target HARQ process being used for retransmission of the HARQ process, there is an unsent data packet in the buffer of the target HARQ process, the data packet is a data packet formed by data at a historical time, and the terminal device invokes the target HARQ process to transmit the data packet on the target configured grant.

There is still a technical problem in the method for performing data transmission based on the foregoing configured grant: quality requirements for data transmission in different service scenarios cannot be met. To resolve the foregoing technical problem, at least one embodiment further provides another communication method. A policy for associating a target configured grant with a HARQ process by a terminal device is dynamically adjusted through second indication information sent by a network device to the terminal device, so that association policies indicated by the second indication information are different in different service scenarios, and quality requirements for data transmission in different service scenarios are met.

Figures 4, 5:
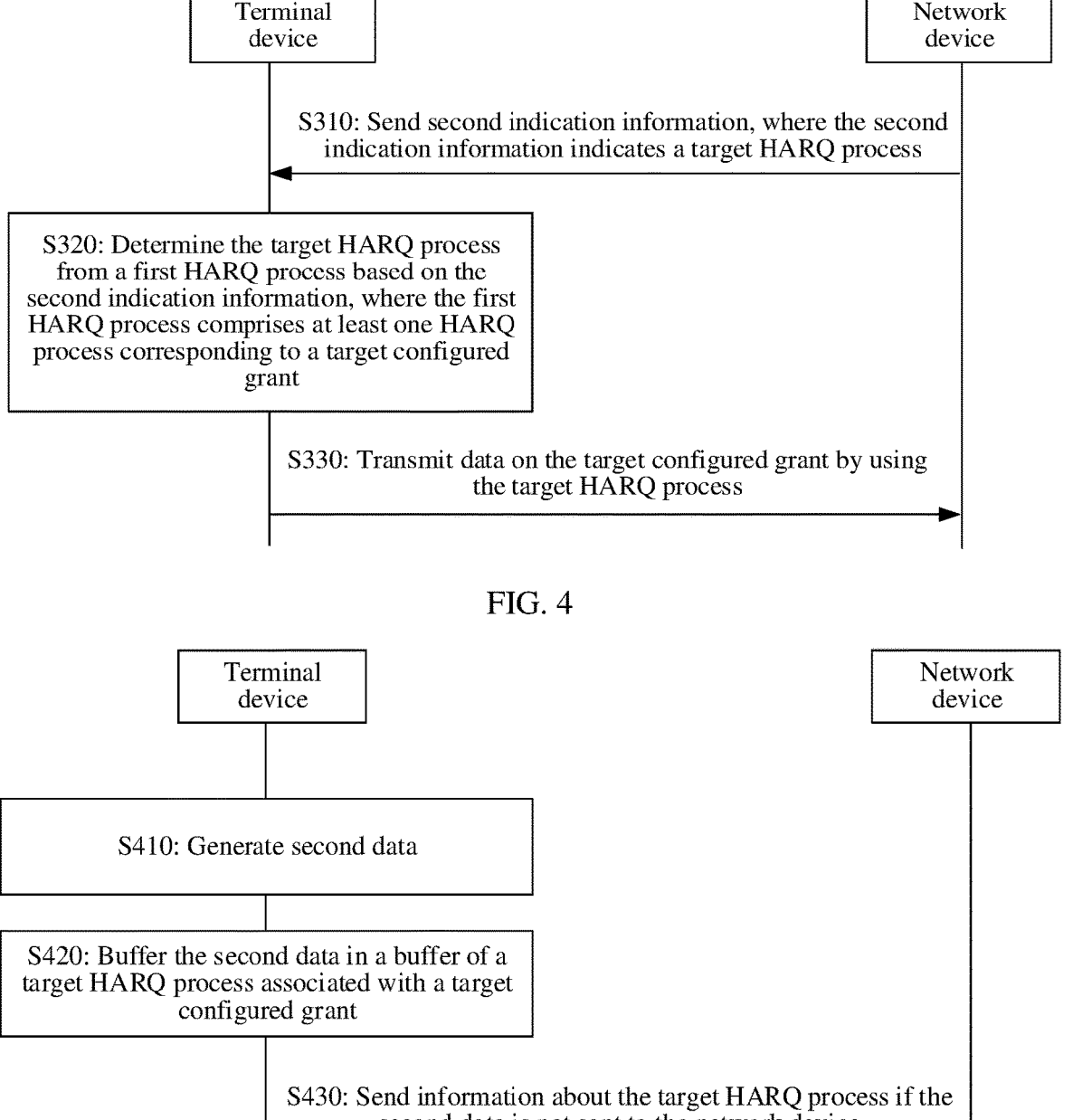
FIG. 4 is a schematic flowchart of another communication method according to at least one embodiment.
FIG. 5 is a schematic flowchart of still another communication method according to at least one embodiment.

FIG. 4 is a schematic flowchart of another communication method according to at least one embodiment. This embodiment relates to a specific process of data transmission between a network device and a terminal device. As shown in FIG. 4, the method includes: S310, S320, and S330.

S310: The network device sends second indication information to the terminal device, where the second indication information indicates a target HARQ process. Correspondingly, the terminal device receives the second indication information from the network device.

The second indication information indicates different association policies or association manners. The association policy or association manner is a policy or a manner of associating a target configured grant with the target HARQ process. The second indication information is carried in RRC signaling, a MAC CE, or DCI.

The network device sends the second indication information to the terminal device once, so that the terminal device is always associated with the HARQ process based on the second indication information. Alternatively, the terminal device requests the second indication information from the network device each time before sending data.

Optionally, that the second indication information indicates a target HARQ process includes: The second indication information indicates that the target HARQ process is a HARQ process in which retransmission needs to be performed in a first HARQ process, or indicates that the target HARQ process is preferentially a HARQ process in which retransmission needs to be performed in a first HARQ process, that is, the target configured grant is preferentially associated with the HARQ process in which retransmission needs to be performed. For example, this association policy is applicable to a service scenario in which a low packet loss rate is used, and the packet loss rate is used for representing quality of data transmission.

Optionally, that the second indication information indicates a target HARQ process includes: The second indication information indicates that the target HARQ process is a HARQ process in which new transmission needs to be performed in the first HARQ process, or indicates that the target HARQ process is preferentially a HARQ process in which new transmission needs to be performed in the first HARQ process, that is, the target configured grant is preferentially associated with the HARQ process in which new transmission needs to be performed. For example, this association policy is applicable to a service scenario that uses high real-time performance.

Optionally, that the second indication information indicates a target HARQ process includes: The second indication information indicates that the target HARQ process is a HARQ process having a highest priority in the first HARQ process. For example, this association policy is applicable to a service scenario in which priorities of a logical channel and a MAC CE are specifically divided, and data of a logical channel having a high priority and a MAC CE having a high priority is transmitted. This association policy is further applicable to a service scenario in which quality of data is used, and data having a high quality requirement is preferentially transmitted.

In actual application, an identifier of the association policy is determined based on a quantity of the association policies. In response to there being three types of association policies, the identifiers of the association policies is 0, 1, and 2. In response to the identifier of the association policy being 0, the target HARQ process is a HARQ process in which retransmission needs to be performed in first HARQ process. In response to the identifier of the association policy being 1, the target HARQ process is a HARQ process in which new transmission needs to be performed in first HARQ process. In response to the identifier of the association policy being 2, the target HARQ process is a HARQ process having a highest priority in the first HARQ process.

S320: The terminal device determines the target HARQ process from the first HARQ process based on the second indication information, where the first HARQ process comprises at least one HARQ process corresponding to the target configured grant.

In response to the second indication information indicating that the target HARQ process is a HARQ process in which retransmission needs to be performed in the first HARQ process, or indicates that the target HARQ process is preferentially a HARQ process in which retransmission needs to be performed in the first HARQ process, the terminal device selects, from the first HARQ process, the HARQ process in which retransmission needs to be performed as a candidate HARQ process. In response to there being one candidate HARQ process, the terminal device uses the candidate HARQ process as the target HARQ process. In response to there being a plurality of candidate HARQ processes, the terminal device randomly selects one candidate HARQ process as the target HARQ process. The target HARQ process is preferentially indicated as a HARQ process in which retransmission needs to be performed in the first HARQ process. but does not mean that the target HARQ process is limited to the HARQ process in which retransmission needs to be performed. For example, all HARQ processes in the first HARQ process are HARQ processes in which new transmission needs to be performed. Because there is no HARQ process in which retransmission needs to be performed, the target HARQ process is a HARQ process in which new transmission needs to be performed.

In response to the second indication information indicating that the target HARQ process is a HARQ process in which new transmission needs to be performed in the first HARQ process, or indicates that the target HARQ process is preferentially a HARQ process in which new transmission needs to be performed in the first HARQ process, the terminal device selects, from the first HARQ process, the HARQ process in which new transmission needs to be performed as a candidate HARQ process. In response to there being one candidate HARQ process, the terminal device uses the candidate HARQ process as the target HARQ process. In response to there being a plurality of candidate HARQ processes, the terminal device randomly selects one candidate HARQ process as the target HARQ process. the target HARQ process is preferentially indicated as a HARQ process in which new transmission needs to be performed in the first HARQ process. but does not mean that the target HARQ process is limited to the HARQ process in which new transmission needs to be performed. For example, all HARQ processes in the first HARQ process are HARQ processes in which retransmission needs to be performed. Because there is no HARQ process in which new transmission needs to be performed, the target HARQ process is a HARQ process in which retransmission needs to be performed.

In response to the second indication information indicating that the target HARQ process is a HARQ process having a highest priority in the first HARQ process, a target HARQ process associated with the target configured grant is determined with reference to the detailed description of step S220.

S330: The terminal device transmits data to a network device on the target configured grant by using the target HARQ process. Correspondingly, the network device receives data on the target configured grant from the terminal device.

This step is referred to the detailed description of step S230. Details are not described herein again.

In response to the terminal device performing data transmission with the network device on an unlicensed spectrum, the terminal device avoids packet loss of a configured grant through an automatic repeat request method. Main steps includes: First, in response to a configured grant resource CG1 arriving, the terminal device selects, from a plurality of hybrid automatic repeat request (HARQ) processes preallocated by a base station, a HARQ process associated with the configured grant resource CG1. Then, the terminal device forms a data packet by using to-be-transmitted data, and stores the data packet in a buffer of the associated HARQ process, so that the data packet on the configured granted resource CG1 is transmitted in the HARQ process. In response to the data packet on the configured granted resource CG1 not being transmitted in the HARQ process, the terminal device waits for a subsequently arrived configured grant resource CG2, to associate the configured grant resource CG2 with the HARQ process, so that the data packet on the configured grant resource CG2 is retransmitted in the HARQ process. In this implementation, the terminal device needs to wait for a subsequently arrived configured grant, and further sends, on the configured grant, an unsuccessfully transmitted data packet, resulting in increasing of a data transmission latency.

To resolve the foregoing technical problem, at least one embodiment further provides another communication method. In a case that there is second data that is not transmitted in a buffer of a target HARQ process, information about the target HARQ process is sent to a network device, so that the network device allocates an uplink grant to the target HARQ process based on the information about the target HARQ process, and the terminal device sends the second data on the allocated uplink grant, to reduce a latency of transmitting the second data.

FIG. 5 is a schematic flowchart of another communication method according to at least one embodiment. This embodiment relates to a specific process of data transmission between a network device and a terminal device. As shown in FIG. 5, the method includes: S410, S420, and S430.

S410: The terminal device generates the second data.

The second data is a formed data packet, for example, a MAC PDU. The terminal device forms a MAC PDU packet by using to-be-sent data. The to-be-sent data is to-be-sent uplink data, and includes but is not limited to: user data and control data.

S420: The terminal device buffers the second data in a buffer of a target HARQ process associated with a target configured grant.

S430: The terminal device sends the information about the target HARQ process to the network device in response to the terminal device not sending the second data to the network device. The terminal device indicates, to the network device through the information, that data is buffered but unsuccessfully sent in a corresponding HARQ process.

The terminal device invokes the target HARQ process to send the second data in the buffer of the target HARQ process to the network device on the target configured grant. The configured grant is periodic. In response to a configured grant arriving, the configured grant is used at a current time. In this case, the terminal device forms a MAC PDU by using to-be-sent data, and stores the MAC PDU in the buffer of the target HARQ process. However, in the following case 1 and case 2, the MAC PDU is not sent, or not all the MAC PDUs are sent.

Case 1: The target configured grant overlaps a first uplink grant in time domain, and a priority of the target configured grant is lower than a priority of the first uplink grant.

The first uplink grant is a dynamic grant or a configured grant.

In response to the target configured grant overlapping the first uplink grant in time domain, and the priority of the target configured grant is lower than the priority of the first uplink grant, the terminal device preferentially transmits to-be-transmitted data on the first uplink grant. The to-be-transmitted data on the first uplink grant is a MAC PDU stored in a buffer of a HARQ process associated with the first uplink grant.

The priority of the target configured grant is determined by the terminal device through a priority of a logical channel of the second data in the buffer of the target HARQ process associated with the target configured grant. In response to the second data belonging to a plurality of logical channels, the terminal device uses a highest priority of the logical channel (LCH) as the priority of the target configured grant. Similarly, the terminal device also determines the priority of the first uplink grant in the foregoing manner. Details are not described herein again in at least one embodiment.

Case 2: A channel corresponding to the target configured grant is not idle, in other words, LBT detection performed by the terminal device does not succeed.

An uplink transmission resource of wireless communication is divided into a licensed spectrum and an unlicensed spectrum. The licensed spectrum is used only by a specific operator in a specific scenario, while the unlicensed spectrum is used by any operator and is a shared spectrum resource.

Because the unlicensed spectrum is the shared spectrum resource, there are many different air interface technologies for the unlicensed spectrum, for example, Wi-Fi, long term evolution (LTE) license assisted access (LAA), and MuL-TEfire. To ensure that different air interface technologies coexist on the unlicensed spectrum, a listen before talk (LBT) mechanism needs to be used to avoid a conflict. The LBT is used for monitoring whether an uplink transmission resource on the unlicensed spectrum is idle. In response to the uplink resource being idle, the terminal device performs data transmission by using the uplink transmission resource. In response to the uplink transmission resource not being idle (or referred to as busy), the terminal device cannot perform data transmission by using the uplink transmission resource, and the terminal device needs to continue to perform the LBT. That the uplink transmission resource is idle means that the uplink resource is not occupied by another terminal device.

In the foregoing LBT mechanism, whether the uplink transmission resource is idle is detected in the following two manners. A first manner is energy detection based on fixed duration. The terminal device detects signal strength on the unlicensed spectrum. In response to the signal strength being greater than a preset threshold, the channel is not idle, that is, the uplink transmission resource is not idle. Otherwise, the channel is idle. A second manner is energy detection based on a backoff mechanism. The terminal device randomly selects a value A from a preset window. After detecting at least A time slots of idle energy detection, the channel is idle. Otherwise, the channel is not idle.

In at least one embodiment, in the foregoing case 1 or case 2, the information about the target HARQ process is sent to the network device, the network device allocates an uplink grant to the target HARQ process, and the terminal device sends the second data to the network device on the allocated uplink grant.

In an example of at least one embodiment, that the terminal device sends the information about the target HARQ process to the network device in response to the terminal device not sending the second data to the network device includes:

The terminal device triggers a first event in response to the terminal device not sending the second data to the network device.

On a premise that the terminal device triggers the first event, the terminal device sends information about a target HARQ process corresponding to the first event to the network device.

The first event is referred to as a status report HARQ status report event. Specifically, each first event is triggered and maintained by one HARQ process, and is used for reflecting that second data in a buffer is unsuccessfully sent in the HARQ process through a physical transmission channel. In at least one embodiment, after the terminal device triggers the first event, the terminal device sends information about a target HARQ process corresponding to the first event to the network device.

In at least one embodiment, a target HARQ process in which the second data is not sent is recorded through the first event, so that the terminal device periodically obtains all target HARQ processes corresponding to all first events triggered in a current period, and further send information about all target HARQ processes in which the second data is not sent in the period to the network device at one time. In this way, the terminal device avoids a case that the information about the target HARQ process is sent once each time the second data is not transmitted in one target HARQ process, which helps reduce an uplink transmission resource occupied for sending the information about the target HARQ process.

In actual application, in response to data in the target HARQ process being unsuccessfully sent, the first event is not always triggered. Instead, the first event needs to be triggered only in response to a specific condition being met. In an example, in response to information about the second data meeting a preset condition, the first event is triggered. That information about the second data meets a preset condition includes at least one of the following: All logical channels corresponding to the second data are preset logical channels or include at least one preset logical channel, and all MAC control elements included in the second data are preset MAC control elements or include at least one preset MAC control element.

The preset logical channel is specified in at least one of the following cells sent by the network device to the terminal device: a logical channel configured cell LogicalChannelConfig and a configured grant configured cell, and a preset MAC control element is specified in a configured grant configured cell sent by the network device to the terminal device. For example, in response to the network device carrying fourth indication information (for example, the fourth indication information is referred to as harqStatusReport information) in the LogicalChannelConfig, or carries fourth indication information and a value of the fourth indication information is enabled or true, the first event is triggered in response to data of the logical channel not being transmitted, and the logical channel is a preset logical channel. In response to the LogicalChannelConfig carrying the fourth indication information and the value of the fourth indication information is disabled or false, or does not carry the fourth indication information, the first event is not triggered in response to the data of the logical channel not being transmitted, and the logical channel is not the preset logical channel. In another example, the network device indicates information about the preset logical channel or the preset MAC control element in the configured grant ConfiguredGrantConfig cell. For example, the network device indicates an identifier of the preset logical channel in the ConfiguredGrantConfig cell.

Optionally, in an example of at least one embodiment, that the terminal device sends the information about the target HARQ process to the network device includes:

In response to the terminal device triggering the first event, and there is an available uplink grant, the terminal device sends the information about the target HARQ process to the network device through the available uplink grant.

The available uplink grant is an available dynamic grant, or is an available configured grant. For example, the available uplink grant is a grant that arrives within a preset or configured time range after the first event is triggered. For example, in response to a new configured grant arriving at a current time or a configured grant is about to arrive at a specified time after a current time, the configured grant is an available configured grant. In another example, in response to the terminal device receiving, at the current time, a dynamic grant allocated by the network device, the dynamic grant is an available dynamic grant.

The information about the target HARQ process is carried in uplink control information transmitted on the uplink grant. For example, an identifier of each target HARQ process is used as a field of the uplink control information, so that identifiers of a plurality of target HARQ processes need to be represented by a plurality of fields. In another example, the information about the target HARQ process is represented by a bitmap, each bit in the bitmap is used for indicating whether there is the second data in the corresponding HARQ process, and the bitmap is used as a field in the uplink control information.

The information about the target HARQ process is also carried in data transmitted on the uplink grant. For example, the identifier of the target HARQ process or the bitmap is located in a MAC CE or a MAC service data unit (SDU) of the data.

In at least one embodiment, the information about the target HARQ process is transmitted by using the available uplink grant without waiting for scheduling a new uplink grant, which helps improve real-time performance of sending the information about the target HARQ process.

Optionally, in an example of at least one embodiment, that the terminal device sends the information about the target HARQ process to the network device includes:

In response to there being no available uplink grant, the terminal device sends a scheduling request to the network device. The scheduling request is used for requesting allocation of the uplink grant. The scheduling request configuration is configured by the network device for the terminal device, and is used in a case that, in response to the terminal device triggering the first event and there is no available uplink grant, the terminal device sends the scheduling request to the network device through the scheduling request configuration, to request the uplink grant.

The terminal device sends the information about the target HARQ process to the network device through the uplink grant allocated by the network device.

The uplink grant is a dynamic grant allocated based on an SR, and the information about the target HARQ process is located in a MAC CE transmitted on the uplink grant, or is located in a MAC SDU, or is located in uplink control information transmitted on the uplink grant.

In at least one embodiment, an uplink grant is scheduled in response to there being no available uplink grant, to send the information about the target HARQ process, and ensure that the information about the target HARQ process is successfully sent.

Optionally, in an example of at least one embodiment, the method in at least one embodiment further includes:

In response to the second data being successfully transmitted or the information about the target HARQ process being successfully sent on a second uplink grant, the terminal device cancels the first event. The second uplink grant is a configured grant or a dynamic grant. For example, the dynamic grant is a grant resource dynamically allocated by the network device based on the information about the target HARQ process. In this case, the second uplink grant is referred to as a second dynamic grant.

For example, the second uplink grant alternatively is a configured grant that arrives after the target configured grant and that is associated with the target HARQ process. In this case, the second uplink grant is referred to as a second configured grant.

The terminal device sends the information about the target HARQ process to the network device. After receiving the information about the target HARQ process, the network device allocates the second dynamic grant based on the information about the target HARQ process, and send the second dynamic grant to the terminal device. The terminal device sends the second data to the network device through the second dynamic grant, and the network device receives the second data.

In an example of at least one embodiment, the network device selects one uplink grant from all uplink grants as the second dynamic grant. To avoid a conflict between uplink grants in time domain as much as possible, the network device first removes, from all uplink grants, a configured grant that has been pre-allocated to the terminal device, and then select the second dynamic grant from remaining uplink grants. In a process of selecting the second dynamic grant, the network device randomly selects an uplink grant as the second dynamic grant. The network device further determines, based on a preset mapping relationship between a time domain position of the uplink grant and information about a first HARQ process, a second dynamic grant associated with the target HARQ process. The preset mapping relationship is used for indicating a policy that the network device allocates the uplink grant to the target HARQ process. The preset mapping relationship is set based on an actual application scenario. This is not limited in at least one embodiment.

After allocating the second dynamic grant, the network device sends a time domain position of the second dynamic grant to the terminal device, so that the terminal device uses the second dynamic grant based on the time domain position. In addition, the network device further sends parameters such as a modulation and coding scheme (MCS) to the terminal device together, so that the terminal device performs data transmission by using an MCS preset in the second dynamic grant.

In an example of at least one embodiment, the network device sends parameters such as the time domain position and the MCS of the second dynamic grant to the terminal device through a message. The network device further adds parameters such as the time domain position and the MCS of the uplink grant to DCI, and send downlink control information to the terminal device.

In at least one embodiment, the first event is canceled after the second data is successfully transmitted, to avoid a resource waste caused by repeated retransmission of the second data.

According to the method shown in FIG. 5, in at least one embodiment, in response to there being the second data that is not transmitted in the buffer of the target HARQ process, the information about the target HARQ process is sent to the network device, to obtain an uplink grant for retransmitting the second data, and reduce a latency of transmitting the second data.

Figure 6:
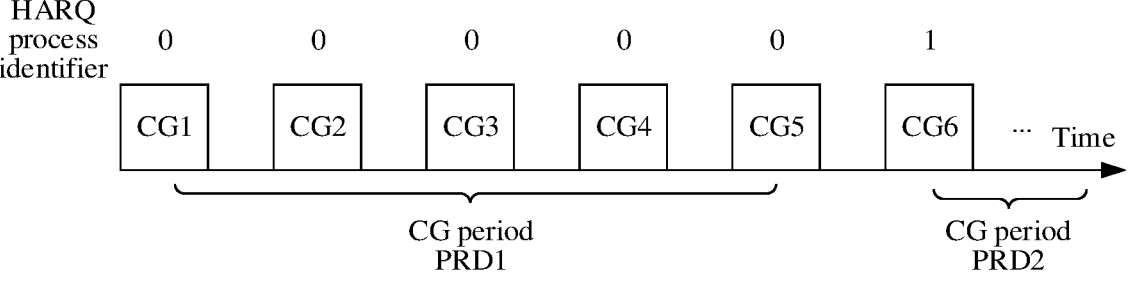
FIG. 6 is a schematic diagram of a relationship between a HARQ process and a configured grant according to at least one embodiment.

Different from the method shown in FIG. 5, at least one embodiment further provides a communication method for reducing a latency of transmitting second data. Based on an existing automatic transmission policy, the network device configures a plurality of CG resources in one CG period, and the plurality of CG resources are associated with a same group of HARQ processes. A time domain position of a first CG resource in a CG period determines a HARQ process associated with the first CG, and another CG is associated with a same HARQ process as the first CG. Each CG resource in a CG period is used for new transmission. The existing automatic transmission policy is as follows: In response to a terminal device being formed a MAC PDU for a CG resource, but the CG resource has a low priority, the terminal device transmits the formed MAC PDU as newly transmitted data by using a CG resource subsequently associated with a same HARQ process. In this embodiment, because a plurality of CG resources associated with the same HARQ process are configured in one CG period, a first CG resource in the CG period has formed a MAC PDU but the CG has a low priority, a next CG that arrives transmits the formed MAC PDU. In this way, duration for waiting for a CG associated with a same HARQ process as the target CG is reduced as much as possible, which helps reduce a latency of transmitting the second data. As shown in FIG. 6, a CG1 to a CG5 are CGs in one CG period PRD1, a CG6 and several subsequent CGs are CGs in a next CG period PRD2, the CG1 is a first CG in the CG period PRD1, and the CG6 is a first CG in the CG period PRD2. An identifier of a HARQ process associated with the CG1 is determined to be 0 based on a time domain position of the CG1, and the CG2 to the CG5 are associated with a same HARQ process as the CG1. An identifier of a HARQ process associated with the CG6 is determined to be 1 based on a time domain position of the CG6, and a remaining CG in the CG period PRD2 is associated with a same HARQ process as the CG6.

In the foregoing solution, in a CG period, an identifier of a HARQ process associated with a first CG is determined by a time domain position of the CG, for example, is determined based on the following formula:

$$HARQID=[floor(CGSB/PD)]module[N] \qquad (2)$$

HARQID represents an identifier of the HARQ process, CGSB represents a time domain position of the first CG, PD represents a period of the CG, N represents a total quantity of HARQ processes, floor represents rounding down, and module represents modulo.

To implement the functions in the foregoing embodiments, a network device and a terminal device include corresponding hardware structures and/or software modules for performing the functions. A person skilled in the art should easily be aware that, in combination with the examples described in at least one embodiment, units, methods, and steps is implemented by hardware, software, or a combination of hardware and software. Whether a function is performed by hardware, software, or hardware driven by computer software depends on a particular application scenario and a design constraint of the technical solutions.

Figure 7:
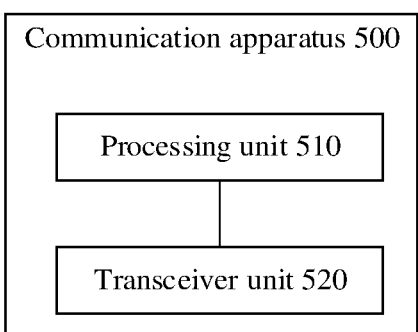
FIG. 7 and FIG. 8 are schematic diagrams of structures of communication apparatuses according to at least one embodiment.
Figure 8:
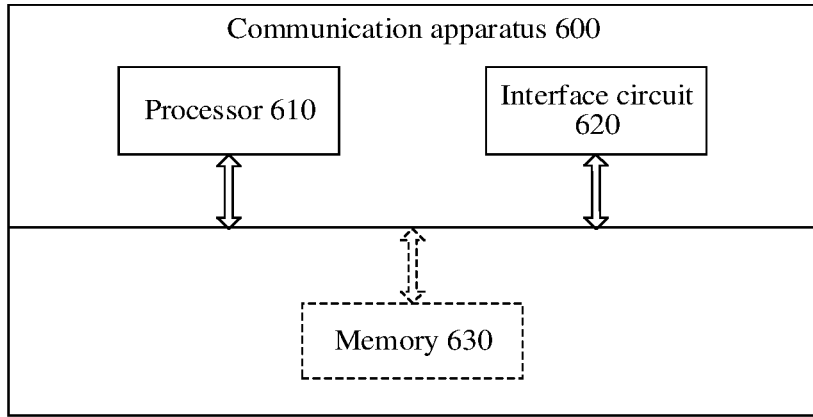

FIG. 7 and FIG. 8 are schematic diagrams of structures of communication apparatuses according to at least one embodiment. The communication apparatus is configured to implement functions of the terminal device or the network device in the foregoing method embodiment. Therefore, advantageous effects of the foregoing method embodiment is also implemented. In at least one embodiment, the communication apparatus is the terminal device 130 or the terminal device 140 shown in FIG. 1, is the radio access network device 120 shown in FIG. 1, or is a module (for example, a chip) used in the terminal device or the network device.

As shown in FIG. 7, a communication apparatus 500 includes a processing unit 510 and a transceiver unit 520. The communication apparatus 500 is configured to implement functions of the terminal device or the network device in the method embodiments shown in FIG. 2, FIG. 4, and FIG. 5.

In response to the communication apparatus 500 being configured to implement a function of the terminal device in the method embodiment shown in FIG. 2, the processing unit 510 is configured to determine priority of a first hybrid automatic repeat request HARQ processes, where the first HARQ process comprises at least one HARQ process corresponding to a target configured grant; the processing unit 510 is further configured to determine a target HARQ process based on the priority of the first HARQ process; and the transceiver unit 520 is configured to transmit data to a network device on the target configured grant by using the target HARQ process.

In response to the communication apparatus 500 being configured to implement a function of the terminal device in the method embodiment shown in FIG. 4, the transceiver unit 520 is configured to receive second indication information from a network device, where the second indication information indicates a target HARQ process; the processing unit 510 is configured to determine the target HARQ process from a first HARQ process based on the second indication information, where the first HARQ process comprises at least one HARQ process corresponding to a target configured grant; and the transceiver unit 520 is further configured to transmit data to a network device on the target configured grant by using the target HARQ process.

In response to the communication apparatus 500 being configured to implement a function of the terminal device in the method embodiment shown in FIG. 5, the processing unit 510 is configured to generate second data; the processing unit 510 is further configured to buffer the second data in a buffer of a target HARQ process associated with a target configured grant; and the transceiver unit 520 is further configured to send, in response to the second data not being sent to a network device, information about the target HARQ process to the network device.

In response to the communication apparatus 500 being configured to implement a function of the network device in the method embodiment shown in FIG. 4, the transceiver unit 520 is configured to send second indication information to a terminal device, where the second indication information indicates a target HARQ process; and the transceiver unit 520 is further configured to receive data from the terminal device on a target configured grant, where the target HARQ process is a HARQ process in a first HARQ process, and the first HARQ process comprises at least one HARQ process corresponding to the target configured grant.

For more detailed descriptions of the foregoing modules, directly refer to related descriptions in the method embodiments shown in FIG. 2, FIG. 4, and FIG. 5. Details are not described herein again.

As shown in FIG. 8, a communication apparatus 600 includes a processor 610 and an interface circuit 620. The processor 610 and the interface circuit 620 are coupled to each other. the interface circuit 620 is configured to receive a signal from a communication apparatus other than the communication apparatus 600, and transmit the signal to the processor 610, or send a signal from the processor 610 to a communication apparatus other than the communication apparatus 600. The processor 610 is configured to implement the method shown in FIG. 2 by using a logic circuit or by executing code instructions.

In response to the communication apparatus 600 being configured to implement the methods shown in FIG. 2, FIG. 4, and FIG. 5, the processor 610 is configured to implement a function of the processing unit 510, and the interface circuit 620 is configured to implement a function of the transceiver unit 520.

Optionally, the communication apparatus 600 further includes a memory 630. The memory 630 is configured to store instructions executed by the processor 610, or store input data used by the processor 610 to run instructions, or store data generated after the processor 610 runs instructions.

In response to the communication apparatus being a chip applied to a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

In response to the communication apparatus being a chip applied to a network device, the chip in the network device implements functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

The processor in at least one embodiment is a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The general purpose processor is a microprocessor or any regular processor or the like.

In at least one embodiment, the processor is a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or a storage medium in any other form well-known in the art. For example, a storage medium is coupled to a processor, so that the processor reads information from the storage medium and write information into the storage medium. Certainly, the storage medium is a component of the processor. The processor and the storage medium is disposed in an ASIC. In addition, the ASIC is located in a network device or a terminal device. Certainly, the processor and the storage medium alternatively exists in the network device or the terminal device as discrete components.

All or some of the foregoing embodiments is implemented by using software, hardware, firmware, or any combination thereof. In response to software being used to implement the embodiments, all or some of the embodiments is implemented in a form of a computer program product. The computer program product includes one or more computer programs or instructions. In response to the computer programs or instructions being loaded and executed on a computer, all or some of the processes or functions in at least one embodiment are executed. The computer is a general-purpose computer, a dedicated computer, a computer network, a network device, a terminal device, or another programmable apparatus. The computer programs or instructions is stored in a computer-readable storage medium, or is transmitted through the computer-readable storage medium. The computer-readable storage medium is any usable medium accessible by a computer, or a data storage device such as a server integrating one or more usable media. The usable medium is a magnetic medium, for example, a floppy disk, a hard disk drive, or a magnetic tape; or is an optical medium, for example, a DVD; or is a semiconductor medium, for example, a solid state disk (SSD).

In at least one embodiment, unless otherwise stated or there is a logic conflict, terms and/or descriptions between different embodiments are consistent and is mutually referenced, and technical features in different embodiments is combined based on an internal logical relationship thereof, to form a new embodiment.

Various numbers in at least one embodiment are merely used for differentiation for ease of description, and are not used to limit the scope of at least one embodiment. The sequence numbers of the foregoing processes do not mean execution sequences, and the execution sequences of the processes should be determined based on functions and internal logic of the processes.

What is claimed is:

1. A communication method applied in a terminal device, comprising:

receiving first indication information from a network device, wherein the first indication information includes instructions to determine a target hybrid automatic repeat request (HARQ) process based on a priority of at least one HARQ process corresponding to a target configured grant;

receiving second indication information from the network device, wherein the second indication information indicates association policies for associating the target configured grant with the target HARQ process;

determining the priority of the at least one HARQ process corresponding to the target configured grant;

storing, by the terminal device, a correspondence between the target configured grant and the at least one HARQ process;

based on the stored correspondence between the target configured grant and the at least one HARQ process, determining the target HARQ process based on the priority of the at least one HARQ process corresponding to the target configured grant; and transmitting data to the network device on the target configured grant by using the target HARQ process.

2. The method according to claim 1, wherein the determining the priority of the at least one HARQ process corresponding to the target configured grant includes determining the target HARQ process is a HARQ process having a highest priority in the at least one HARQ process.

3. The method according to claim 1, wherein the determining the priority of the at least one HARQ process includes:

determining the priority of the at least one HARQ process based on first data corresponding to the at least one HARQ process, wherein the first data includes: a media access control protocol data unit (MAC PDU) buffered in a buffer of the at least one HARQ process, or data that can be transmitted in the at least one HARQ process.

4. The method according to claim 3, wherein the determining the priority of the at least one HARQ process based on first data corresponding to the first HARQ process includes:

determining the priority of the at least one HARQ process based on at least one of the following information: a priority of a logical channel corresponding to the first data, a priority of a MAC control element includes in the first data, and quality of service information of the first data.

5. The method according to claim 1, wherein the determining the target HARQ process based on the priority of the at least one HARQ process includes:

in response to there being at least two HARQ processes having same and highest priorities in the at least one HARQ process, determining the target HARQ process from the at least two HARQ processes.

6. The method according to claim 5, wherein the determining the target HARQ process from the at least two HARQ processes includes:

determining the target HARQ process from the at least two HARQ processes based on whether one of the at least two HARQ processes is used for retransmitting data;

determining the target HARQ process from the at least two HARQ processes based on identifiers of the at least two HARQ processes; or determining the target HARQ process from the at least two HARQ processes based on remaining duration of a configured grant timer associated with the at least two HARQ processes.

7. A communication apparatus, comprising:

at least one processor; and a memory coupled to the at least one processor and configured to store executable instructions for execution by the at least one processor to instruct the at least one processor to:

receive first indication information from a network device, wherein the first indication information includes instructions to determine a target hybrid automatic repeat request (HARQ) process based on a priority of at least one HARQ process corresponding to a target configured grant;

receive second indication information from the network device, wherein the second indication information indicates association policies for associating the target configured grant with the target HARQ process;

determine, from the association policies the priority of the at least one HARQ process corresponding to the target configured grant;

store, by the terminal device, a correspondence between the target configured grant and the at least one HARQ process;

based on the stored correspondence between the target configured grant and the at least one HARQ process, determine a target HARQ process based on the priority of the at least one HARQ process corresponding to the target configured grant; and transmit data to the network device on the target configured grant by using the target HARQ process.

8. The apparatus according to claim 7, wherein the target HARQ process is a HARQ process having a highest priority in the at least one HARQ process.

9. The apparatus according to claim 7, wherein the at least one processor is further configured to:

determine the priority of the at least one HARQ process based on first data corresponding to the at least one HARQ process, wherein the first data includes: a media access control protocol data unit (MAC PDU) buffered in a buffer of the at least one HARQ process, or data that can be transmitted in the at least one HARQ process.

10. The apparatus according to claim 9, wherein the at least one processor is further configured to:

determine the priority of the at least one HARQ process based on at least one of the following information: a priority of a logical channel corresponding to the first data, a priority of a MAC control element included in the first data, and quality of service information of the first data.

11. The apparatus according to claim 7, wherein the at least one processor is further configured to:

in response to there being at least two HARQ processes having same and highest priorities in the at least one HARQ process, determine the target HARQ process from the at least two HARQ processes.

12. The apparatus according to claim 11, wherein the at least one processor is further configured to:

determine the target HARQ process from the at least two HARQ processes based on whether one of the at least two HARQ processes is used for retransmitting data;

determine the target HARQ process from the at least two HARQ processes based on identifiers of the at least two HARQ processes; or determine the target HARQ process from the at least two HARQ processes based on remaining duration of a configured grant timer associated with the at least two HARQ processes.

13. A communication apparatus, comprising:

at least one processor; and a memory coupled to the at least one processor and configured to store executable instructions for execution by the at least one processor to instruct the at least one processor to:

send first indication information to a terminal device, wherein the first indication information includes instructions to determine a target hybrid automatic repeat request (HARQ) process based on a priority of at least one HARQ process corresponding to a target configured grant;

send second indication information from the network device, wherein the second indication information indicates association policies for associating a target configured grant with the target HARQ process;

determine, from the association policies the priority of the at least one HARQ process corresponding to the target configured grant;

provide a correspondence between the target configured grant and the at least one HARQ process;

based on the stored correspondence between the target configured grant and the at least one HARQ process, determine a target HARQ process based on the priority of the at least one HARQ process corresponding to the target configured grant; and receive data from the terminal device on the target configured grant by using the target HARQ process.

14. The apparatus according to claim 13, wherein the target HARQ process is a HARQ process having a highest priority in the at least one HARQ process.

* * * * *